May 16, 1961
G. N. LOOMIS
2,984,389
FERTILIZER DISTRIBUTOR
Filed Jan. 20, 1956
2 Sheets-Sheet 1
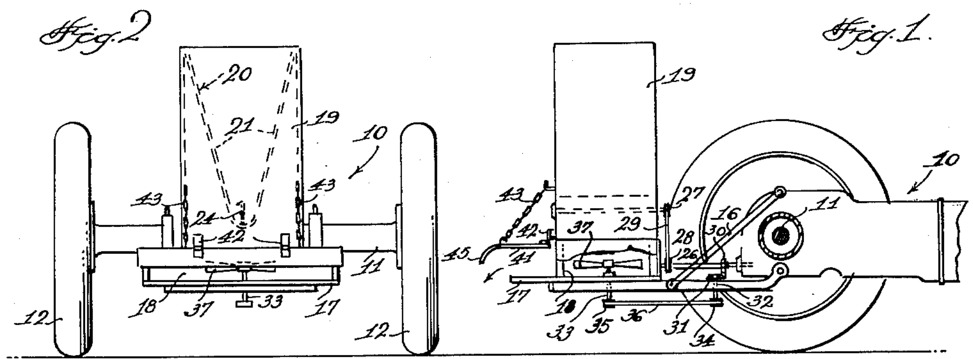
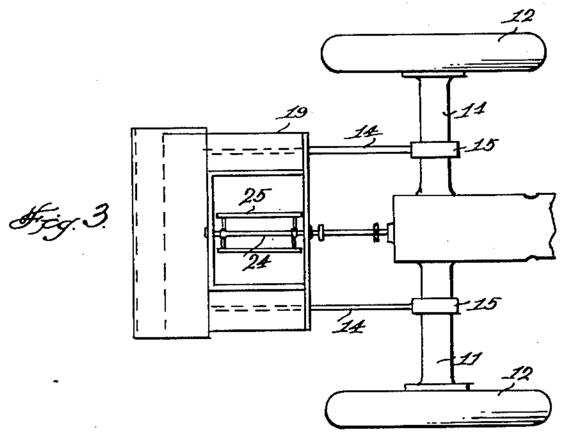
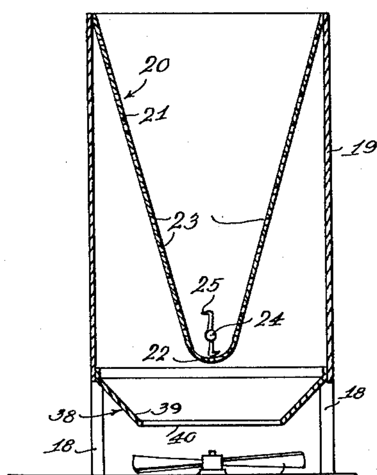
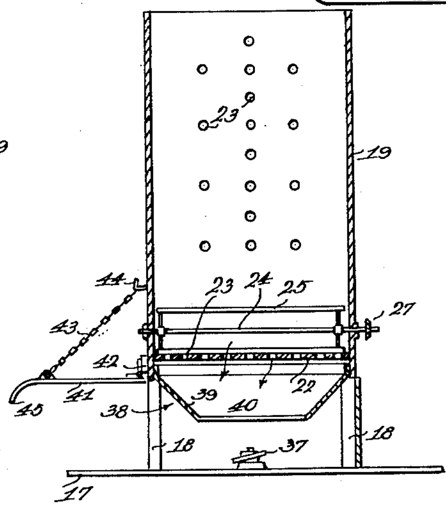
INVENTOR.
GEORGE N. LOOMIS
BY Victor J. Evans & Co.
ATTORNEYS May 16, 1961 G. N. LOOMIS 2,984,389
FERTILIZER DISTRIBUTOR
Filed Jan. 20, 1956 2 Sheets-Sheet 2
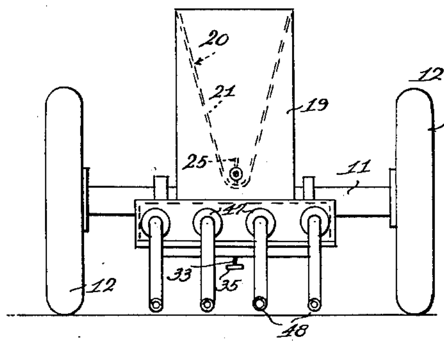
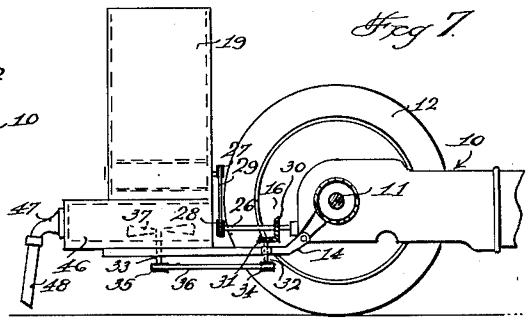
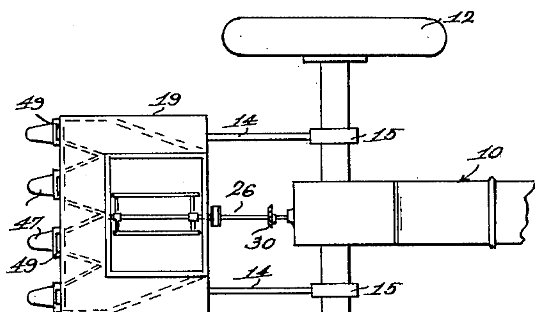
Fig. 11
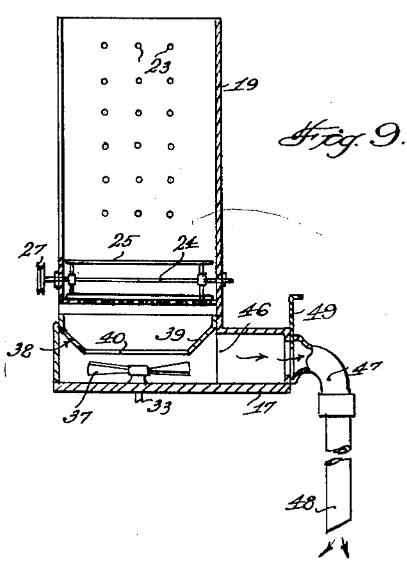
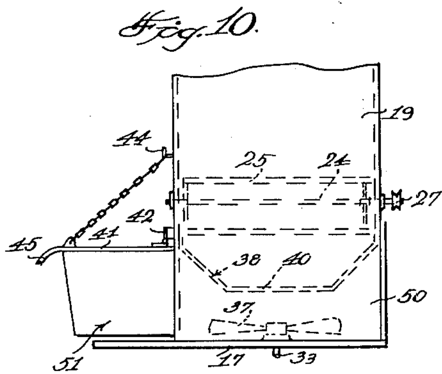
INVENTOR.
GEORGE N. LOOMIS
BY Victor J. Evans & Co.
ATTORNEYS United States Patent Office 2,984,389

Patented May 16, 1961

2,984,389

FERTILIZER DISTRIBUTOR

George N. Loomis, Cardston, Alberta, Canada

Filed Jan. 20, 1956, Ser. No. 560,353

3 Claims. (Cl. 222—236)

This invention relates to agricultural equipment, and more particularly to a device for spreading fertilizer or the like.

The object of the invention is to provide a fertilizer distributor which will effectively spread or broadcast fertilizer over a desired area.

Another object of the invention is to provide a fertilizer distributor which is adapted to be mounted on the rear of a tractor, and whereby the tractor power take-off is adapted to be used for driving an agitator which serves to break up any lumps in the fertilizer, there being an impeller or rotary member which is adapted to broadcast or distribute fertilizer over the desired area.

Another object of the invention is to provide a fertilizer distributor which is extremely simple and inexpensive to manufacture.

Other objects and advantages will be apparent during the course of the following description.

In the accompanying drawings, forming a part of this application and in which like numerals are used to designate like parts throughout the same:

Figure 1 is a side elevational view illustrating the fertilizer distributor of the present invention mounted on the rear of a tractor with one wheel removed.

Figure 2 is a rear elevational view of the assembly of Figure 1.

Figure 3 is a top plan view of the assembly of Figures 1 and 2.

Figure 4 is a vertical sectional view taken through the fertilizer distributor.

Figure 5 is a vertical sectional view taken at right angles to the view shown in Figure 4.

Figure 6 is a rear elevational view illustrating a modified fertilizer distributor.

Figure 7 is a side elevational view of the assembly shown in Figure 6 with one wheel removed.

Figure 8 is a top plan view of the distributor shown in Figures 6 and 7.

Figure 9 is a vertical sectional view taken through the fertilizer distributor of Figures 6, 7 and 8.

Figure 10 is a fragmentary side elevational view illustrating another modification.

Figure 11 is a perspective view illustrating the V-shaped guide members for use with the modification of Figure 10.

Referring in detail to the drawings, the numeral 10 designates a portion of a conventional tractor which includes the usual rear axle 11 and rear wheels 12.

The present invention is directed to a fertilizer distributor and the fertilizer distributor of the present invention is adapted to be mounted at the rear of the tractor 10. Thus, extending rearwardly from the axle 11 is a pair of arms 14 which may be secured to the axle 11 by means of brackets 15. Braces 16 may be connected to the arms 14 for reinforcing or strengthening the assembly.

Mounted on the arms 14 and secured thereto in any suitable manner, is a horizontally disposed platform or base 17, and extending upwardly from the platform 17 is a plurality of vertically disposed spaced parallel legs 18 which support a hollow housing 19 that defines a hopper. The top of the housing 19 is open whereby a suitable quantity of fertilizer can be placed therein. Arranged within the housing 19 is a baffle 20 which includes a pair of inclined or angularly arranged sections 23 that are interconnected together by a lower curved portion 22. The baffle 20 is provided with a plurality of apertures or openings 23 whereby the fertilizer can pass therethrough.

Extending into the housing 19 is a first shaft 24 which has an agitator 25 mounted thereon, and the agitator 25 is adapted to rotate so as to break up any lumps which are in the fertilizer. For rotating the agitator 25, a pulley 27 is mounted on the outer end of the shaft 24, and a pulley 28 is mounted on a power take-off shaft 26. An endless belt 29 is trained over the pair of pulleys 27 and 28.

The shaft 26 is adapted to be connected to the power take-off of the tractor 10, and mounted on the shaft 26 is a bevel gear 30 which meshes with a beveled gear 31 and the bevel gear 31 is secured to a vertically disposed shaft 32. A pulley 34 is mounted on the lower end of the shaft 32, and an endless belt 36 is trained over the pulley 34, the belt 36 being also trained over a pulley 35 on the lower end of a fourth shaft 33. The shaft 33 extends upwardly through the platform 17, and an impeller 37 is mounted on the upper end of the shaft 33.

Arranged in the lower end of the housing 19 is a guide member 38 which includes inclined walls 39 and an opening 40 whereby the fertilizer can pass through the opening 40 and onto the impeller 37 so that the fertilizer will be distributed or broadcast rearwardly over the area to be fertilized. A door or apron 41 is hingedly connected to the lower portion of the housing 19 by means of hinges 42, and chains 43 have one end connected to the apron 41, while the other ends of the chains 43 are adjustably connected to brackets 44. A free end of the apron 41 terminates in a curved flange 45. By moving the chains 43, the position of the apron 41 can be raised or lowered so that the area over which the fertilizer is spread can be readily controlled or adjusted.

Referring to Figures 6 through 9 of the drawings, there is shown a modified fertilizer distributor wherein a casing 46 is mounted below the housing 19. Extending rearwardly from the casing 46 is a plurality of nozzles 47, and depending from each of the nozzles 47 is a conduit or tube 48. Thus, the fertilizer which is thrown out through the nozzles 47 will pass down through the conduits 48 to a position contiguous to the ground so that the assembly shown in Figures 6 through 9 is especially suitable for use in applying fertilizer to row crops or the like. Slide valves 49 can be manually operated so as to control the flow of fertilizer through the nozzles 47, Figure 9.

Referring to Figures 10 and 11 there is shown a further modification wherein a casing 50 is position below the housing 19. A guide member 51 is arranged rearwardly of the casing 50, and the guide member 51 includes a plurality of V-shaped channels 52. Openings 53 are provided between certain of the channels 52 so that fertilizer thrown up by the impeller will pass out through the openings 53 onto the area to be fertilized.

From the foregoing, it is apparent that there has been provided a fertilizer distributor which is adapted to be mounted at the rear of a tractor such as the tractor 10. In use, the arms 14 extend rearwardly from the tractor and are secured thereto in any suitable manner, as for example by means of the brackets 15. The arms 14 support a platform 17, and supported above the platform 17 is the hopper 19 which has its upper end open so that bulk fertilizer can be readily placed therein from a suitable container or the like. The fertilizer which is placed in the hopper or housing 19 passes down through the apertures 23 and the baffle 20 and the rotating agitator 25 helps break up any lumps in the fertilizer. The fertilizer then passes down through the opening 40 and into the path of the rotating impeller 37 so that this fertilizer is thrown out rearwardly over the area to be fertilized. By adjusting the position of the chains 43, the apron 41 can be raised or lowered so that the curved flange 45 will control the area being fertilized.

The shaft 26 is adapted to be connected to the usual power take-off on the tractor, and as the shaft 26 rotates, it causes rotation of the shaft 24 through the medium of the endless belt 29. Similarly, as the shaft 26 rotates, it causes rotation of the shaft 32 due to the provision of the intermeshing gears 30 and 31. As the shaft 32 rotates, it rotates the shaft 33 due to the provision of the endless belt 36. Rotation of the shaft 33 causes rotation of the impeller 37 which causes the fertilizer to be thrown out the back of the device. Rotation of the shaft 24 causes the rotation of the agitator 25 which breaks up any lumps in the fertilizer.

When it is desired to direct the fertilizer to a particular area, for example, into the vicinity of row crops, the arrangement shown in Figures 6 through 9 is used. Thus, in Figures 6 through 9, the valves 49 may be opened or raised so that the fertilizer will be thrown backwardly through the nozzles 47 and this fertilizer will then pass down through the conduits 48, and the fertilizer will leave through the lower open ends of the conduits.

In Figures 10 and 11 there is shown a further modification wherein the fertilizer is adapted to be thrown out through the spaces 53 between the V-shaped channel members 52.

The impeller 25 serves to scatter the fertilizer. The present invention can be used for spreading fertilizer for grain and crops, row crops, peas, beans, sugar beets and the like. The apron 41 can be raised or lowered so that the area being covered by the fertilizer can be controlled as desired. The curved flange 45 acts as a deflector for the fertilizer. The device can be made of any suitable material such as a material which will not corrode or rust, and the size and shape of the parts can be varied as desired.

The broadcaster of the present invention can be placed at any desired locality and the fan can be driven by means of a suitable engine if desired. The fertilizer distributor of the present invention will effectively spread or broadcast fertilizer over a desired area and the device can be operated either by the power take-off of a tractor or else it can be operated by a small motor and it also can be mounted on a wagon, truck, or cart of any type.

I claim:

1. In a fertilizer distributor for attachment to a tractor, a pair of spaced parallel arms, a platform supported by said arms, a casing mounted on said platform, a housing arranged above said casing, a first shaft extending into said housing, an agitator mounted on said first shaft, a second shaft adapted to be connected to the tractor power take-off, belt and pulley means connecting said first and second shafts together, a third shaft arranged at right angles with respect to said second shaft, bevel gear means connecting said second and third shafts together, a fourth shaft extending upwardly into said casing, belt and pulley means connecting said third and fourth shafts together, an impeller mounted on the upper end of said fourth shaft, a plurality of nozzles extending rearwardly from said casing, and downwardly projecting tubes depending from said nozzles and terminating contiguous to the ground.

2. In a fertilizer distributor for attachment to a tractor, a pair of spaced parallel arms, a platform supported by said arms, a casing mounted on said platform, a housing arranged above said casing, a first shaft extending into said housing, an agitator mounted on said first shaft, a second shaft adapted to be connected to the tractor power take-off, belt and pulley means connecting said first and second shafts together, a third shaft arranged at right angles with respect to said second shaft, bevel gear means connecting said second and third shafts together, a fourth shaft extending upwardly into said casing, belt and pulley means connecting said third and fourth shafts together, an impeller mounted on the upper end of said fourth shaft, a plurality of nozzles extending rearwardly from said casing, and downwardly projecting tubes depending from said nozzles and terminating contiguous to the ground, and manually operable slide valves connected to said nozzles.

3. A fertilizer distributor for attachment to a tractor, comprising a pair of spaced parallel arms, a horizontally disposed platform supported by said arms, a casing mounted on said platform, a housing arranged above said casing, the upper end of said housing being open, a first shaft extending into said housing, an agitator mounted on said first shaft for breaking up any lumps in the fertilizer, a second shaft adapted to be connected to the tractor power take-off, belt and pulley means connecting said first and second shafts together, a third shaft arranged at right angles with respect to said second shaft, means connecting said second and third shafts together, a fourth shaft extending upwardly into said casing, belt and pulley means connecting said third and fourth shafts together, an impeller mounted on the upper end of said fourth shaft, a guide member arranged above said impeller and provided with inclined walls and having an opening for the passage therethrough of fertilizer, a plurality of spaced apart nozzles extending rearwardly from said casing, a plurality of downwardly projecting tubes depending from said nozzles and terminating contiguous to the ground, whereby the fertilizer which is thrown out through the nozzles will pass down through the tubes to a position contiguous to the ground so that fertilizer can be applied to row crops or the like, and a plurality of manually operable slide valves connected to said nozzles for controlling the flow of fertilizer through the nozzles.

References Cited in the file of this patent

UNITED STATES PATENTS

| | | |
|---|---|---|
| 2,157,630 | Root | May 9, 1939 |
| 2,334,376 | Bauer | Nov. 16, 1943 |
| 2,336,113 | McLaughlin | Dec. 7, 1943 |
| 2,500,682 | Hoffstetter | Mar. 14, 1950 |
| 2,532,518 | Scott | Dec. 5, 1950 |
| 2,619,767 | Woock | Dec. 2, 1952 |
| 2,638,350 | Lyerly | May 12, 1953 |
| 2,668,060 | Tygart | Feb. 2, 1954 |
| 2,686,384 | Lemmond | Aug. 17, 1954 |

FOREIGN PATENTS

| | | |
|---|---|---|
| 1,002,894 | France | Nov. 7, 1951 |
| 1,010,656 | France | Mar. 26, 1952 |